US012767230B2

(12) United States Patent
Sakakibara et al.

(10) Patent No.: US 12,767,230 B2
(45) Date of Patent: Oct. 20, 2026

(54) VEHICLE SIDE PORTION STRUCTURE

(71) Applicant: TOYOTA JIDOSHA KABUSHIKI KAISHA, Toyota (JP)

(72) Inventors: Kosuke Sakakibara, Toyota (JP); Takaharu Tateishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 399 days.

(21) Appl. No.: 18/485,227

(22) Filed: Oct. 11, 2023

(65) Prior Publication Data

US 2024/0182115 A1 Jun. 6, 2024

(30) Foreign Application Priority Data

Dec. 2, 2022 (JP) ................................ 2022-193800

(51) Int. Cl.

*B62D 21/15* (2006.01)
*B60J 5/06* (2006.01)
(Continued)

(52) U.S. Cl.

CPC .............. *B62D 21/157* (2013.01); *B60J 5/06* (2013.01); *E05D 15/101* (2013.01); *H01M 50/242* (2021.01); *H01M 50/249* (2021.01); *B60K 1/04* (2013.01); *B60K 2001/0438* (2013.01); *E05Y 2201/624* (2013.01); *E05Y 2201/684* (2013.01);
(Continued)

(58) Field of Classification Search

CPC ..................... B62D 21/157; B60K 2001/0438; B60K 1/04; B60J 5/06; E05D 15/101; E05D 15/1042; E05D 15/1047; E05D 2015/1055; E05D 2015/1057; H01M 50/242; H01M 50/249

See application file for complete search history.

(56) References Cited

U.S. PATENT DOCUMENTS

2019/0382051 A1 12/2019 Toyota

FOREIGN PATENT DOCUMENTS

JP 2017128299 A * 7/2017
JP 2019018822 A * 2/2019 .............. B60K 1/04
(Continued)

OTHER PUBLICATIONS

Kato et al., Japanese Patent No. 2017-128299 A1, English translation dated 2025. (Year: 2017).*
(Continued)

*Primary Examiner* — Caroline N Butcher
(74) *Attorney, Agent, or Firm* — SOLARIS Intellectual Property Group, PLLC

(57) ABSTRACT

A vehicle side portion structure includes a battery at a lower side of a floor panel and a lower hinge at a lower portion of a sliding door. The lower hinge is configured to support the sliding door such that the sliding door is slidable in a vehicle longitudinal direction. In a state in which the sliding door is closed, at least an inner side portion in a vehicle left-right direction of the lower hinge is disposed at a position overlapping with the battery as seen in a side view. A concave portion is formed at a portion of the battery that the inner side portion of the lower hinge faces in the vehicle left-right direction when the sliding door is closed. The concave portion has a size such that at least a portion of the inner side portion of the lower hinge is insertable into the concave portion.

9 Claims, 7 Drawing Sheets

(51) Int. Cl.
*B60K 1/04* (2019.01)
*E05D 15/10* (2006.01)
*H01M 50/242* (2021.01)
*H01M 50/249* (2021.01)

(52) U.S. Cl.
CPC ... *E05Y 2201/688* (2013.01); *E05Y 2900/531* (2013.01); *H01M 2220/20* (2013.01)

(56) References Cited

FOREIGN PATENT DOCUMENTS

| | | | | | |
|---|---|---|---|---|---|
| JP | 2019-214314 | A | | 12/2019 | |
| WO | WO-2022157724 | A1 | * | 7/2022 | ............... B60K 1/04 |

OTHER PUBLICATIONS

Kato et al., Japanese Patent No. 2019-018822 A1, English translation dated 2025. (Year: 2019).*

* cited by examiner

VEHICLE SIDE PORTION STRUCTURE

CROSS-REFERENCE TO RELATED APPLICATION

This application claims priority under 35 USC 119 from Japanese Patent Application No. 2022-193800, filed on Dec. 2, 2022, the disclosure of which is incorporated by reference herein in its entirety.

BACKGROUND

Technical Field

The present disclosure relates to a vehicle side portion structure.

Related Art

There have conventionally been disclosed vehicles that a battery case, which houses a battery stack formed from plural battery cells, is disposed at the vehicle lower side of a floor panel, and sliding doors that open and close the left and right side portions are provided (see, for example, Japanese Patent Application Laid-Open (JP-A) No. 2019-214314).

In such a vehicle, lower hinges, which are mounted to the lower portions of the sliding doors and support the sliding doors such that the sliding doors can slide in the vehicle longitudinal direction, are disposed further toward the vehicle upper side than the battery case.

SUMMARY

However, in order to enlarge the space within the vehicle, there are cases that the lower hinges of the side doors that are in the closed states are disposed at positions overlapping with side portions at a peripheral wall of the battery case as seen in a side view. In such a case, at least inner side end portions, in the vehicle transverse direction, of the lower hinges face the side portions of the battery case in the vehicle transverse direction. Therefore, if the vehicle is collided with from a side, and the lower hinge is displaced toward an inner side in the vehicle transverse direction, there is the concern that at least an inner side end portion of the lower hinge will interfere with (hit) the battery case, and that the battery case, and moreover the battery stack (battery cells) housed in the battery case, will break.

The present disclosure provides a vehicle side portion structure that, even though a lower hinge of a sliding door is disposed at a position overlapping with a battery or a battery case as seen in a side view, at the time of a side collision of the vehicle, interference of the lower hinge with the battery or the battery case can be suppressed.

A vehicle side portion structure of a first aspect of the present disclosure has: a battery disposed at a lower side of a floor panel of a vehicle; and a lower hinge provided at a lower portion of a sliding door that opens and closes a side portion of the vehicle, the lower hinge configured to support the sliding door such that the sliding door is slidable in a vehicle longitudinal direction, and, in a state in which the sliding door is closed, at least an inner side portion in a vehicle left-right direction of the lower hinge being disposed at a position overlapping with the battery as seen in a side view. A concave portion is formed at a portion of the battery that the inner side portion of the lower hinge faces in the vehicle left-right direction in the state in which the sliding door is closed, and the concave portion has a size such that at least a portion of the inner side portion of the lower hinge is insertable into the concave portion.

In accordance with the vehicle side portion structure of the first aspect, the concave portion, which has a size such that at least a portion of the inner side portion of the lower hinge can be inserted therein, is formed at a portion of the battery that the inner side portion of the lower hinge faces in the vehicle left-right direction in the state in which the sliding door is closed. Accordingly, in a case in which the vehicle is collided with from the side and the lower hinge of the sliding door is displaced toward an inner side in the left-right direction, at least a portion of the inner side portion of the lower hinge is accommodated in the concave portion. Namely, at least a portion of the inner side portion of the lower hinge is prevented from interfering with (hit) the battery. In this way, even though the lower hinge (the inner side portion) of the sliding door is disposed at a position of overlapping with the battery as seen in a side view, at the time of a side collision of the vehicle, the lower hinge (the inner side portion of the lower hinge) interfering with the battery is suppressed.

A vehicle side portion structure of a second aspect of the present disclosure is the vehicle side portion structure of the first aspect, wherein a height, in a vehicle vertical direction, of a bottom surface of the concave portion is less than or equal to a height, in the vehicle vertical direction, of a lower surface of the lower hinge.

In accordance with the vehicle side portion structure of the second aspect, the height of the bottom surface of the concave portion that is formed at the battery is less than or equal to the height of the lower surface of the lower hinge. Accordingly, in a case in which the vehicle is collided with from the side and the lower hinge of the sliding door is displaced toward the inner side, at least a portion of the inner side portion of the lower hinge is reliably accommodated in the concave portion, and the collision load is prevented from being transmitted from the inner side portion of the lower hinge to the battery.

A vehicle side portion structure of a third aspect of the present disclosure is the vehicle side portion structure of the second aspect, wherein an impact absorbing member is fitted into the concave portion so as to fill the concave portion.

In accordance with the vehicle side portion structure of the third aspect, the impact absorbing member is fitted into the concave portion, which is formed at the battery, so as to fill the concave portion. Accordingly, at the time when the vehicle is collided with from the side and the lower hinge of the sliding door is displaced toward the inner side, at least a portion of the inner side portion of the lower hinge is received by the impact absorbing member. Namely, the collision load, which is transmitted by the lower hinge and is directed toward the inner side, is absorbed by the impact absorbing member.

A vehicle side portion structure of a fourth aspect of the present disclosure is the vehicle side portion structure of the third aspect, wherein plural ribs that run along the vehicle left-right direction are formed at an upper surface of the impact absorbing member.

In accordance with the vehicle side portion structure of the fourth aspect, the plural ribs that run along the vehicle left-right direction are formed at the upper surface of the impact absorbing member. Accordingly, at the time when the vehicle is collided with from the side and the lower hinge of the sliding door is displaced toward the inner side, at least a portion of the inner side portion of the lower hinge is more effectively received by the impact absorbing member.

Namely, the collision load, which is transmitted by the lower hinge and is directed toward the inner side, is more effectively absorbed by the impact absorbing member.

A vehicle side portion structure of a fifth aspect of the present disclosure is the vehicle side portion structure of any one of the first through fourth aspects, wherein the battery is housed in a battery case.

In accordance with the vehicle side portion structure of the fifth aspect, the battery is housed in a battery case. Accordingly, at the time when the vehicle is collided with from the side and the lower hinge of the sliding door is displaced toward the inner side, at least a portion of the inner side portion of the lower hinge interfering with (hitting) the battery is effectively suppressed or prevented by the battery case.

A vehicle side portion structure of a sixth aspect of the disclosure is the vehicle side portion structure of the fifth aspect, wherein a concave portion corresponding to the concave portion of the battery is formed at the battery case.

In accordance with the vehicle side portion structure of the sixth aspect, a concave portion, which corresponds to the concave portion formed at a portion of the battery, is formed at the battery case. Accordingly, at the time when the vehicle is collided with from the side and the lower hinge of the sliding door is displaced toward the inner side, at least a portion of the inner side portion of the lower hinge is accommodated within the concave portion of the battery case. Namely, at least a portion of the inner side portion of the lower hinge of the sliding door is prevented from interfering with (hit) the battery case as well.

A vehicle side portion structure of a seventh aspect of the present disclosure has: a battery case disposed at a lower side of a floor panel of a vehicle; and a lower hinge provided at a lower portion of a sliding door that opens and closes a side portion of the vehicle, the lower hinge configured to support the sliding door such that the sliding door is slidable in a vehicle longitudinal direction, and, in a state in which the sliding door is closed, at least an inner side portion in a vehicle left-right direction of the lower hinge being disposed at a position overlapping with the battery case as seen in a side view. A concave portion is formed at a portion of the battery case that the inner side portion of the lower hinge faces in the vehicle left-right direction in a state in which the sliding door is closed. The concave portion has a size such that at least a portion of the inner side portion of the lower hinge is insertable into the concave portion.

In accordance with the vehicle side portion structure of the seventh aspect, the concave portion, which has a size such that at least a portion of the inner side portion of the lower hinge can be inserted into the concave portion, is formed at a portion of the battery case that the inner side portion of the lower hinge of the sliding door faces in the vehicle left-right direction in the state in which the sliding door is closed. Accordingly, at the time when the vehicle is collided with from the side and the lower hinge of the sliding door is displaced toward the inner side, at least a portion of the inner side portion of the lower hinge is accommodated within the concave portion. Namely, at least a portion of the inner side portion of the lower hinge of the sliding door is prevented from interfering with (hit) the battery case. In this way, in accordance with the present aspect, even though the lower hinge (the inner side portion) of the sliding door is disposed at a position of overlapping with the battery case as seen in a side view, at the time of a side collision of the vehicle, the lower in hinge (the vehicle transverse direction inner side portion of the lower hinge) interfering with the battery case is suppressed.

As described above, in accordance with the present disclosure, even though the lower hinge of the sliding door is disposed at a position overlapping with the battery or the battery case as seen in a side view, at the time of a side collision of the vehicle, interference of the lower hinge with the battery or the battery case can be suppressed.

DETAILED DESCRIPTION

Embodiments relating to the present disclosure are described in detail hereinafter on the basis of the drawings. Note that arrow UP that is shown appropriately in the respective drawings indicates the vehicle upward direction, arrow FR indicates the vehicle frontward direction, arrow LH indicates the vehicle leftward direction, and arrow RH indicates the vehicle rightward direction. Further, when vertical, longitudinal and left-right directions are mentioned in the following description, they refer to the vertical, the longitudinal and the left-right of the vehicle, unless otherwise indicated. Moreover, the left-right direction is the same as the vehicle transverse direction.

First Embodiment

Figure 1:
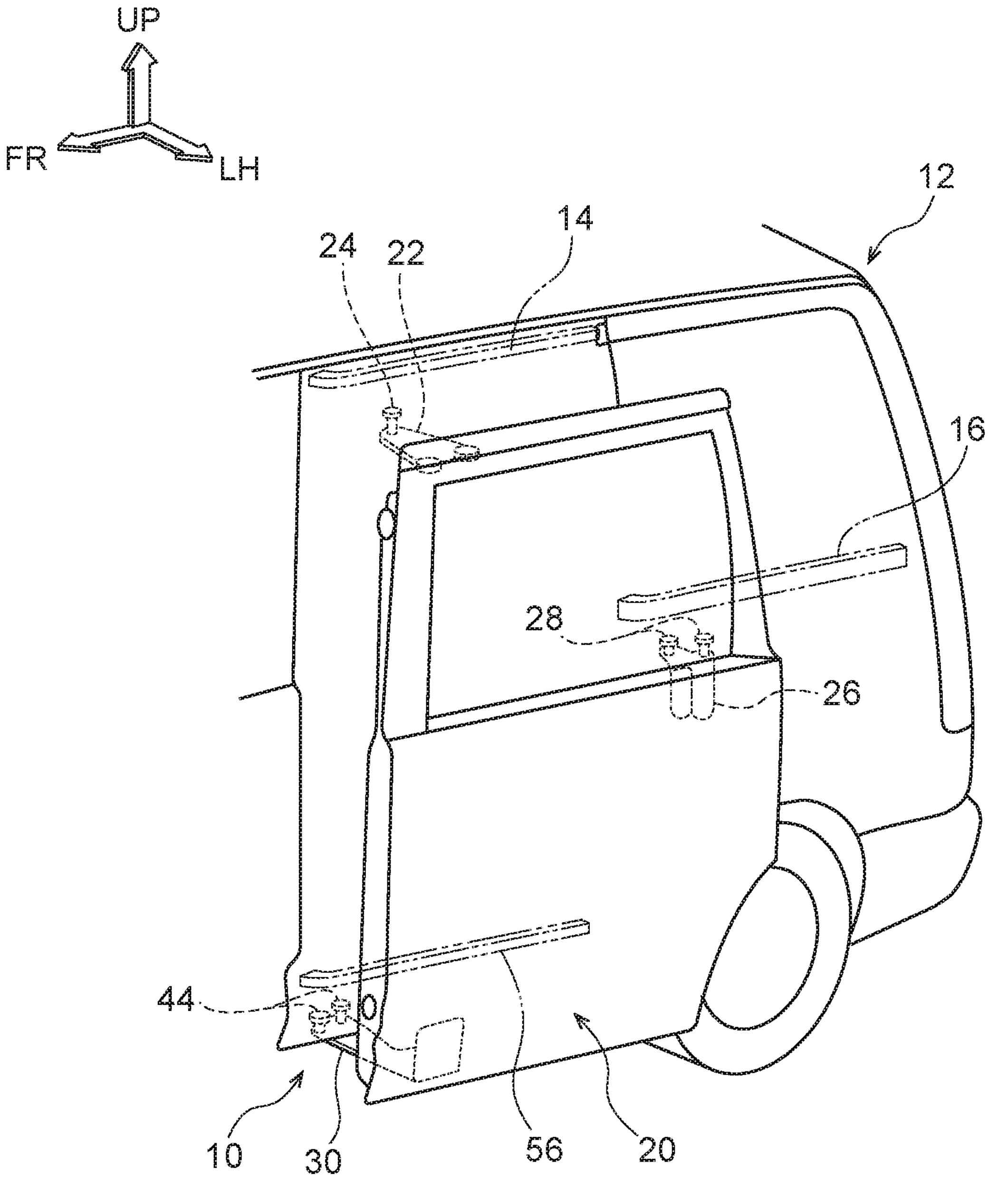
FIG. 1 is a schematic perspective view illustrating a side portion of a vehicle that is provided with a vehicle side portion structure relating to a first embodiment.

A first embodiment is described. As illustrated in FIG. 1, a vehicle 12 that is provided with a vehicle side portion structure 10 relating to a first embodiment has sliding doors 20 that open and close the side portions of the vehicle 12. The sliding doors 20 are provided so as to be slidable at the left and right side portions of the vehicle 12, and are structured so as to be able to open and close the doorways such that passengers get into and out of the rear seat of the vehicle 12.

Upper guide portions 14, center guide portions 16 and lower guide portions 56 are provided at the vehicle 12. The upper guide portions 14 are provided at the upper portion of the vehicle 12 and extend in the longitudinal direction. The center guide portions 16 are provided at the substantially central portion in the vertical direction of the vehicle 12, and extend in the longitudinal direction. Although details thereof are described later, the lower guide portions 56 are provided at the lower portion of the vehicle 12 and extend in the longitudinal direction.

In each of the sliding doors 20, an upper hinge 22 is mounted to an upper portion of a sliding door 20, and a guide roller 24 provided at the upper hinge 22 engages with an upper guide portion 14. Further, a center hinge 26 is mounted to the substantially central portion in the vertical direction of the sliding door 20, and guide rollers 28 provided at the center hinge 26 engage with a center guide portion 16. Moreover, a lower hinge 30 is mounted to the lower portion of the sliding door 20, and guide rollers 44 provided at the lower hinge 30 engage with a lower guide portion 56.

The sliding door 20 is thereby supported so as to be movable in the longitudinal direction with respect to the vehicle 12. Note that, in FIG. 1, the guide portions and the guide rollers are drawn so as to be apart from one another for convenience of explanation, but in actuality, the respective guide rollers are inserted in the respective guide portions. Further, the sliding door 20 is structured to include a door outer panel 20A at the left-right direction outer side and a door inner panel 20B at the left-right direction inner side. The sliding door 20 is structured by the peripheral edge portions of the door outer panel 20A and the door inner panel 20B being joined together by hemming processing (see FIG. 2).

Figure 2:
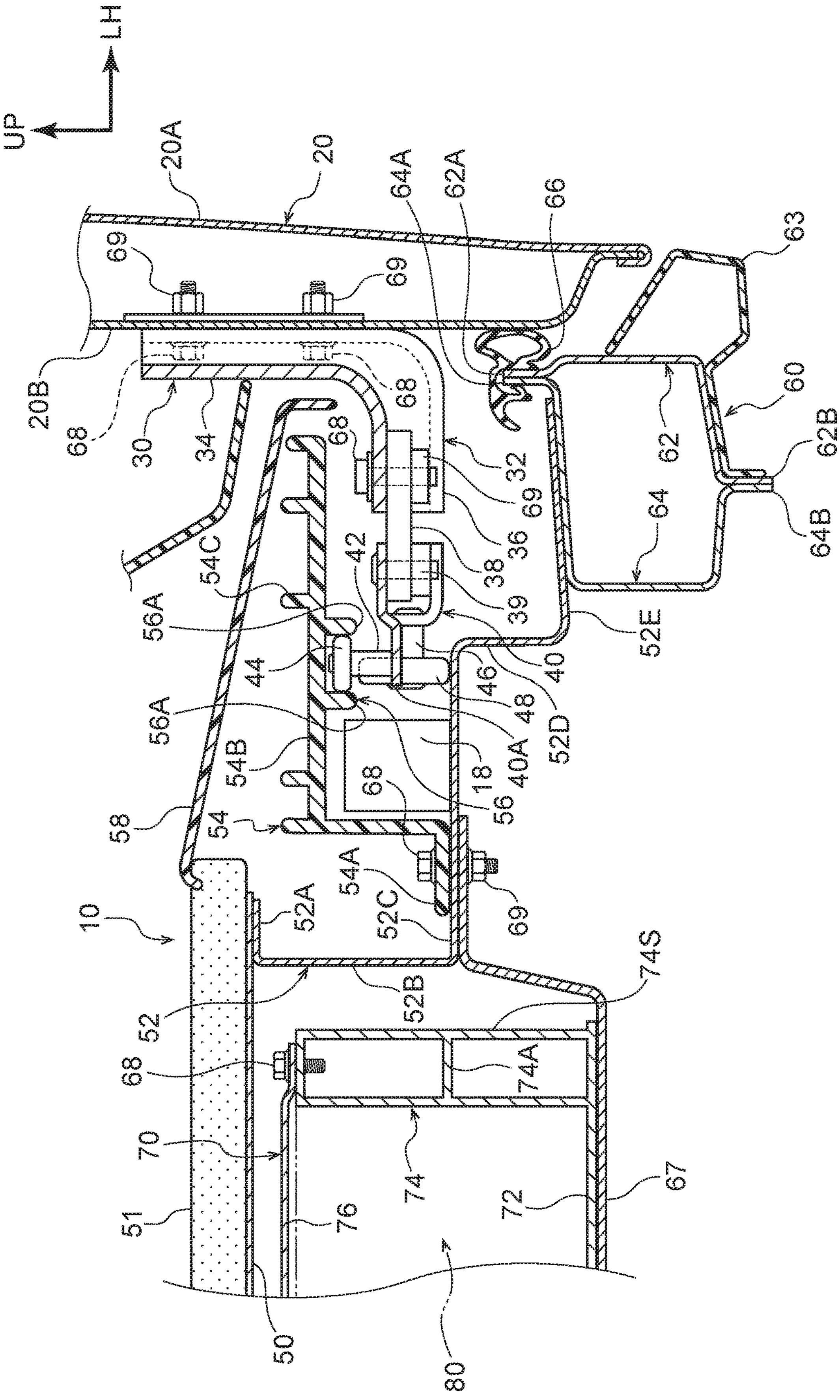
FIG. 2 is a schematic front view illustrating, in a partial cross-section and in an enlarged manner, the vehicle side portion structure relating to the first embodiment.

As illustrated in FIG. 2, the lower hinge 30 is mounted to the lower portion of the sliding door 20. The lower hinge 30 has a hinge main body 32 that is formed in a substantial "L" shape as seen in a front view that is viewed from the longitudinal direction (hereinafter simply expressed as "as seen in a front view"). The hinge main body 32 is structured to include a fixed portion 34 extending in the vertical direction along the door inner panel 20B, and a base supporting portion 36 extending integrally from the lower end portion of the fixed portion 34 toward an inner side in the left-right direction.

The fixed portion 34 is formed, in cross-section, substantially in the shape of a hat that opens toward an outer side in the left-right direction, and is fastened and fixed to a side surface, which faces toward the inner side in the left-right direction of the door inner panel 20B by bolts 68 and nuts 69. The base supporting portion 36 is formed, in cross-section, substantially in the shape of a hat that opens toward the lower side, and extends to a lower side of an end portion at an outer side in the left-right direction of a step 54 that is described later. Note that the base supporting portion 36 is drawn as a substantially flat-plate shape in FIG. 4 in order to simplify illustration.

As illustrated in FIG. 2, one end portion of a connecting member 38 is fixed by the bolts 68 and the nuts 69 to an inner side end portion in the left-right direction of the base supporting portion 36. The connecting member 38 is a substantially flat-plate-shaped member that extends in the left-right direction with the vertical direction being the plate thickness direction thereof. A base portion 40, which serves as an inner side portion in the left-right direction of the lower hinge 30, is mounted by a pin 39 to another end portion of the connecting member 38 so as to be swingable about an axis running in the vertical direction.

The base portion 40 extends from the connecting member 38 toward an inner side in the left-right direction. A pair of shaft portions 42 whose axial directions being in the vertical direction are provided at the top surface of an inner side end portion 40A of the base portion 40. The guide rollers 44 are mounted so as to be freely rotatable to the upper end portions of the shaft portions 42, respectively. The guide rollers 44 are respectively placed between a pair of guide pieces 56A that structure the lower guide portion 56.

A shaft portion 46 whose axial direction being in the left-right direction is provided at the base portion 40. A load roller 48 is mounted so as to be freely rotatable to an inner side end portion of the shaft portion 46. The load roller 48 contacts a step under panel 52 that is described later, and the lower hinge 30 is supported at the step under panel 52 via the load roller 48.

A floor panel 50 that structures the floor surface of the vehicle cabin is provided at the vehicle 12. The floor panel 50 extends in the left-right direction and in the longitudinal direction with the vertical direction being the plate thickness direction thereof. A floor carpet 51 is laid on the top surface of the floor panel 50. The step under panel 52 is provided between the floor panel 50 and a rocker 60 that is described later.

Namely, the floor panel 50 and the rocker 60 are connected by the step under panel 52. The upper end portion of the step under panel 52 is an upper flange portion 52A that is bent along a lower surface of the floor panel 50. The upper flange portion 52A is superposed with the lower surface of the floor panel 50 and is joined thereto by welding or the like.

Further, the step under panel 52 has a first vertical wall portion 52B extending integrally toward the lower side from the upper flange portion 52A as seen in front view, a first lateral wall portion 52C bent and extending integrally from a lower end portion of the first vertical wall portion 52B toward an outer side, a second vertical wall portion 52D extending integrally from an outer side end portion in the left-right direction of the first lateral wall portion 52C toward the lower side, and a second lateral wall portion 52E bent and extending integrally from a lower end portion of the second vertical wall portion 52D toward the an outer side in the left-right direction. The second lateral wall portion 52E is superposed on a rocker inner panel 64, which is described later, from an upper side and is joined thereto by welding or the like.

The step 54, which is made of resin and is for ingress/egress of passengers, is mounted to the first lateral wall portion 52C of the step under panel 52. The step 54 is formed in a substantial "L" shape as seen in front view, and the lower end portion of the step 54 is a fixed portion 54A that is bent along the first lateral wall portion 52C. The fixed portion 54A is fastened and fixed to the first lateral wall portion 52C by the bolts 68 and the nuts 69.

The step 54 extends toward an upper side from the fixed portion 54A, and then extends toward an outer side in the left-right direction. Ribs 54C for reinforcement that extend along the longitudinal direction are provided at a step main body 54B that extends in the left-right direction. Plural (five in the illustrated structure) ribs 54C are provided, and integrally project-out toward the upper side from the step main body 54B.

The lower guide portion 56 is formed at the lower surface side of the step main body 54B. The lower guide portion 56 is structured to include the pair of left and right guide pieces 56A that integrally project-out toward the lower side from the step main body 54B. The pair of guide pieces 56A extend in the longitudinal direction along the step main body 54B, and the guide rollers 44 of the lower hinge 30 are inserted between the pair of guide pieces 56A. Namely, the lower guide portion 56 guides the lower hinge 30 such that the lower hinge 30 can move in the longitudinal direction.

A scuff plate 58 made of resin is provided at an upper side of the step 54. The scuff plate 58 extends from an outer side end in the left-right direction of the floor panel 50 to an outer side end of the step main body 54B, and is mounted to the step 54 by unillustrated clips or the like. Further, an opening/closing device 18 of the sliding door 20 is mounted to the step 54. The opening/closing device 18 is disposed at the top surface of the first lateral wall portion 52C, and includes parts such as a motor and a pulley and the like that are necessary for automatic opening and closing of the sliding door 20.

The rocker 60, which has a closed cross-sectional structure and extends in the longitudinal direction, is provided at an outer side in the left-right direction of a battery case 70, which is described later, at a lower side of the lower hinge 30. The rocker 60 is structured to include a rocker outer panel 62 positioned at an outer side, and the rocker inner panel 64 positioned at an inner side, in the left-right direction.

The rocker outer panel 62 is formed substantially in the shape of a crank as seen in a front view. Specifically, the rocker outer panel 62 extends toward a lower side from an upper flange 62A that is at an upper end portion thereof, and the lower portion is bent toward an inner side in the left-right direction. A lower flange 62B extends from an inner side end portion of the rocker outer panel 62 toward a lower side.

The rocker inner panel 64 is formed, in cross-section, substantially in the shape of a hat that opens toward an outer side in the left-right direction as seen in a front view. Specifically, an upper flange 64A is formed at an upper end portion of the rocker inner panel 64, and the upper flange 64A is superposed with the upper flange 62A of the rocker outer panel 62 and is joined thereto by welding or the like. Further, a lower flange 64B is formed at a lower end of the rocker inner panel 64, and the lower flange 64B is superposed with the lower flange 62B of the rocker outer panel 62 and is joined thereto by welding or the like. Due thereto, the rocker 60 has a closed cross-sectional structure.

Note that weather stripping 66 is mounted to the upper flange 62A and the upper flange 64A that have been joined together. The region between the rocker 60 and the sliding door 20 is sealed by the weather stripping 66. A rocker molding 63 is mounted to an outer side of the rocker outer panel 62 by unillustrated clips or the like. The rocker molding 63 is made of resin, and covers the lower portion of the rocker outer panel 62 from the outer side in the left-right direction.

The battery case 70, which is made of metal and extends over substantially the entire region of the floor panel 50 as seen in plan view, is disposed at an inner sides in the left-right direction of the rockers 60 and the base portions 40 of the lower hinges 30, at a lower side of the floor panel 50. Note that the battery case 70 is supported by unillustrated side members and cross members and the like.

The battery case 70 is structured to include a bottom wall 72, a peripheral wall 74, and a cover wall 76. A battery stack 80 serving as a battery and formed from plural battery cells 82 (see FIG. 3), and a wire harness and a cooling device (neither of which is illustrated) and the like are housed at an interior of the battery case 70. Electric power can be supplied from the battery stack 80 to an unillustrated driving motor. Note that the battery stack 80 is structured such that the plural battery cells 82 are grouped together in two levels that are up and down (see FIG. 3).

The bottom wall 72 of the battery case 70 is formed in a substantially rectangular shape as seen in plan view, with the vertical direction being the plate thickness direction thereof. The peripheral wall 74 stands integrally at an outer peripheral edge portion of the bottom wall 72. Namely, the peripheral wall 74 is formed substantially in the shape of a rectangular frame along the outer peripheral portion of the bottom wall 72. The cover wall 76 is formed with the vertical direction being the plate thickness direction thereof, and in a substantially rectangular shape so as to correspond to the outer shapes of the bottom wall 72 and the peripheral wall 74. The outer peripheral edge portion of the cover wall 76 is fastened to the top surface of the peripheral wall 74 by the bolts 68.

Note that, at the peripheral wall 74, left and right side portions 74S that are positioned at outer sides in the left-right direction are formed as closed cross-sectional structures as seen in a front view, and are partitioned in the vertical direction into two closed cross-sections by partitioning walls 74A that are flat-plate-shaped and are provided integrally with substantially central portions in the vertical direction of the side portions 74S. Further, an under-cover 67 is provided at a lower side of the battery case 70. Both end portions in the left-right direction of the under-cover 67 are fastened, together with the steps 54, to the step under panels 52 by the bolts 68 and the nuts 69.

Further, as illustrated in FIG. 2, in a state in which the sliding door 20 is closed, the base supporting portion 36 and the base portion 40 of the lower hinge 30 are disposed at the outer side in the left-right direction of the battery case 70 as seen in a front view. In other words, in a state in which the sliding door 20 is closed, the base supporting portion 36 and the base portion 40 of the lower hinge 30 are disposed at a position that overlaps the side portion 74S, which faces the outer side of the battery case 70 as seen in a side view that is viewed in the left-right direction (hereinafter simply expressed as "as seen in a side view").

Figure 3:
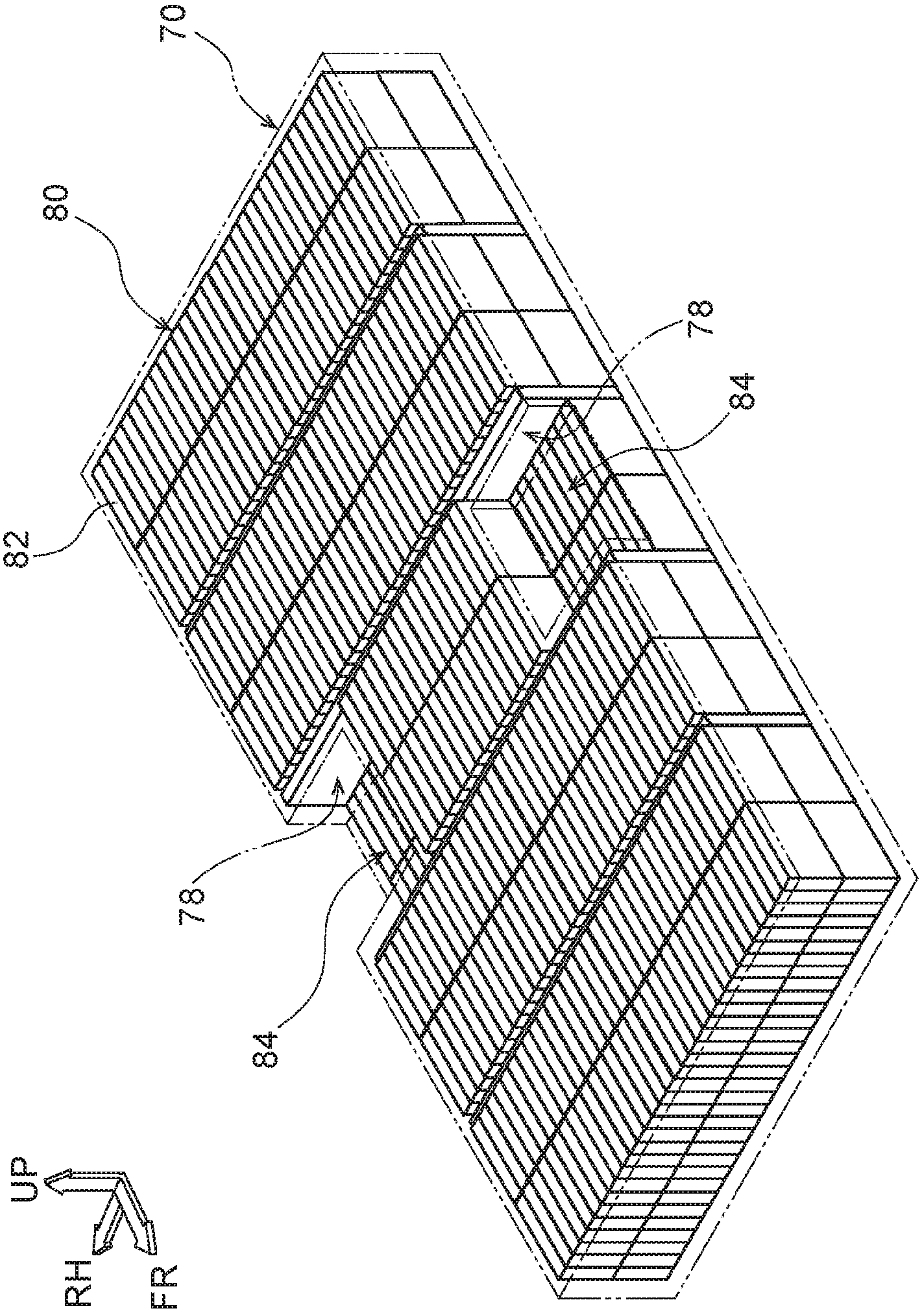
FIG. 3 is a schematic perspective view illustrating a battery that structures the vehicle side portion structure relating to the first embodiment.

Further, as illustrated in FIG. 3, concave portions 84 that are rectangular as seen in plan view and as seen in a side view are formed at outer sides in the left-right direction of the battery cells 82 and at the upper level of the battery stack 80, and at the substantially central portion in the longitudinal direction. The concave portions 84 are formed by not providing some battery cells 82 at the regions described above. Further, as illustrated in FIG. 3 and FIG. 4, concave portions 78 corresponding to the concave portions 84 (that are the same shapes as these concave portions 84) are formed at an outer sides in the left-right direction of the upper side of the battery case 70, at the substantially central portion in the longitudinal direction of the battery case 70.

Figure 4:
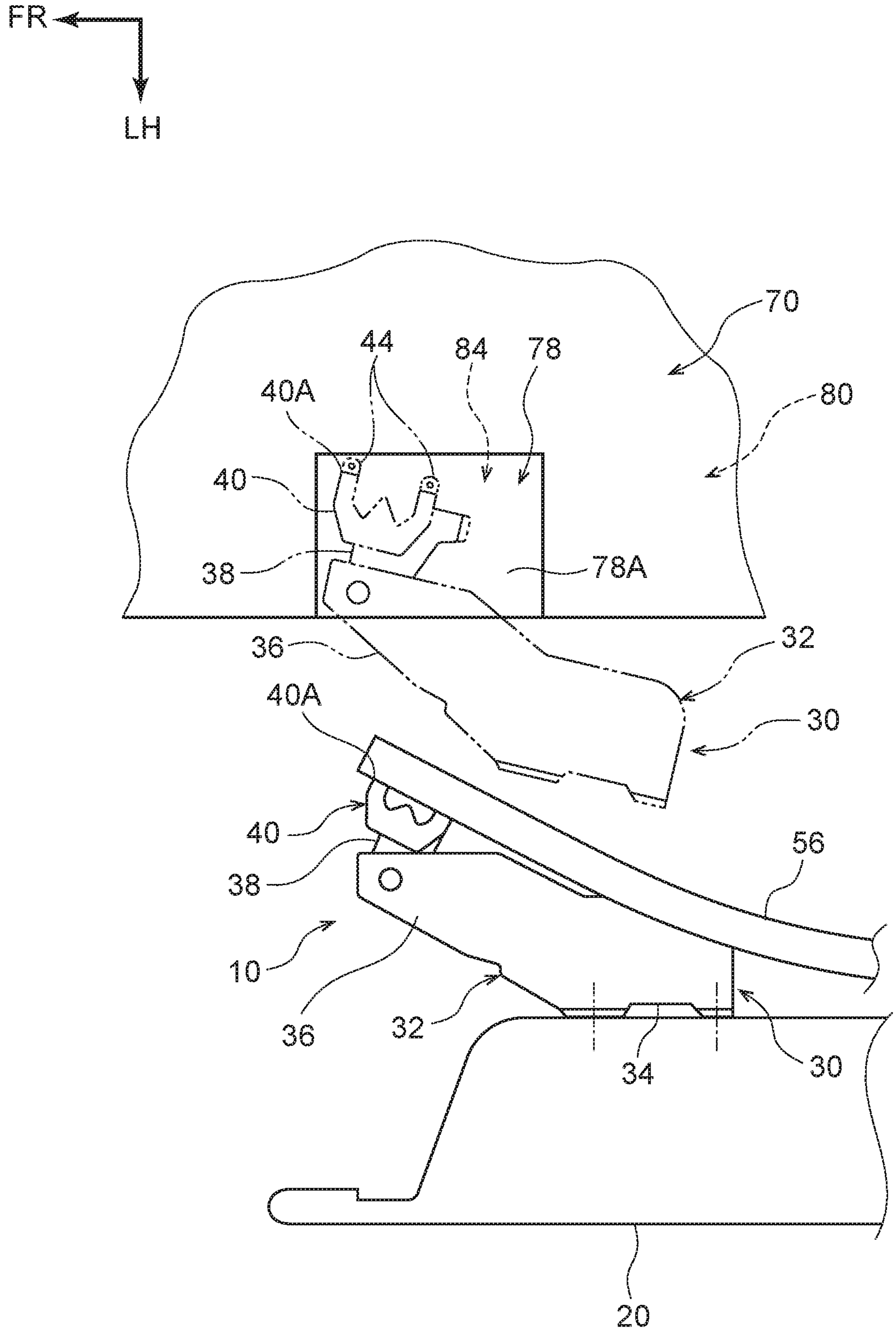
FIG. 4 is a schematic plan view illustrating a portion of the vehicle side portion structure relating to the first embodiment in an enlarged manner.

As illustrated in FIG. 4, in a state in which the sliding door 20 is closed, at least a portion of the base portion 40 of the lower hinge 30 (a portion that includes the inner side end portion 40A) is disposed at substantially the same position in the longitudinal direction as the concave portion 78 of the battery case 70 (the concave portion 84 of the battery stack 80) as seen in plan view. In other words, at least a portion of the base portion 40 of the lower hinge 30 (a portion that includes the inner side end portion 40A) faces the concave portion of the battery case 70 (the concave portion 84 of the battery stack 80) in the left-right direction, as seen in plan view and as seen in a side view (refer to FIG. 4, FIG. 5).

Note that the size of the concave portion 78 formed at the battery case 70 (the concave portion 84 formed at the battery stack 80) is a size such that at least a portion of the base portion 40 of the lower hinge 30 (a portion including the inner side end portion 40A) is insertable therein (see FIG. 4). Further, as illustrated in FIG. 5, with the lower surface of the bottom wall 72 of the battery case 70 as a reference, height H1 of a bottom surface 78A at the concave portion 78 (the concave portion 84) is less than or equal to height H2 of a lower surface 36A of the base supporting portion 36 and a lower surface 40B of the base portion 40 ($H1 \leq H2$).

Operation of the vehicle side portion structure 10 relating to the first embodiment that is structured as described above is described next.

As described above, at the vehicle 12, in a state in which the sliding door 20 is closed, the base supporting portion 36 and the base portion 40 of the lower hinge 30 are disposed at the outer side in the left-right direction of the battery case 70 as seen in a front view (the base supporting portion 36 and the base portion 40 are disposed at a position overlapping with the side portion 74S of the battery case 70 as seen in a side view). Accordingly, when the vehicle 12 is collided with from the side, the base supporting portion 36 and the base portion 40 of the lower hinge 30 are displaced toward the inner side in the left-right direction.

Figure 5:
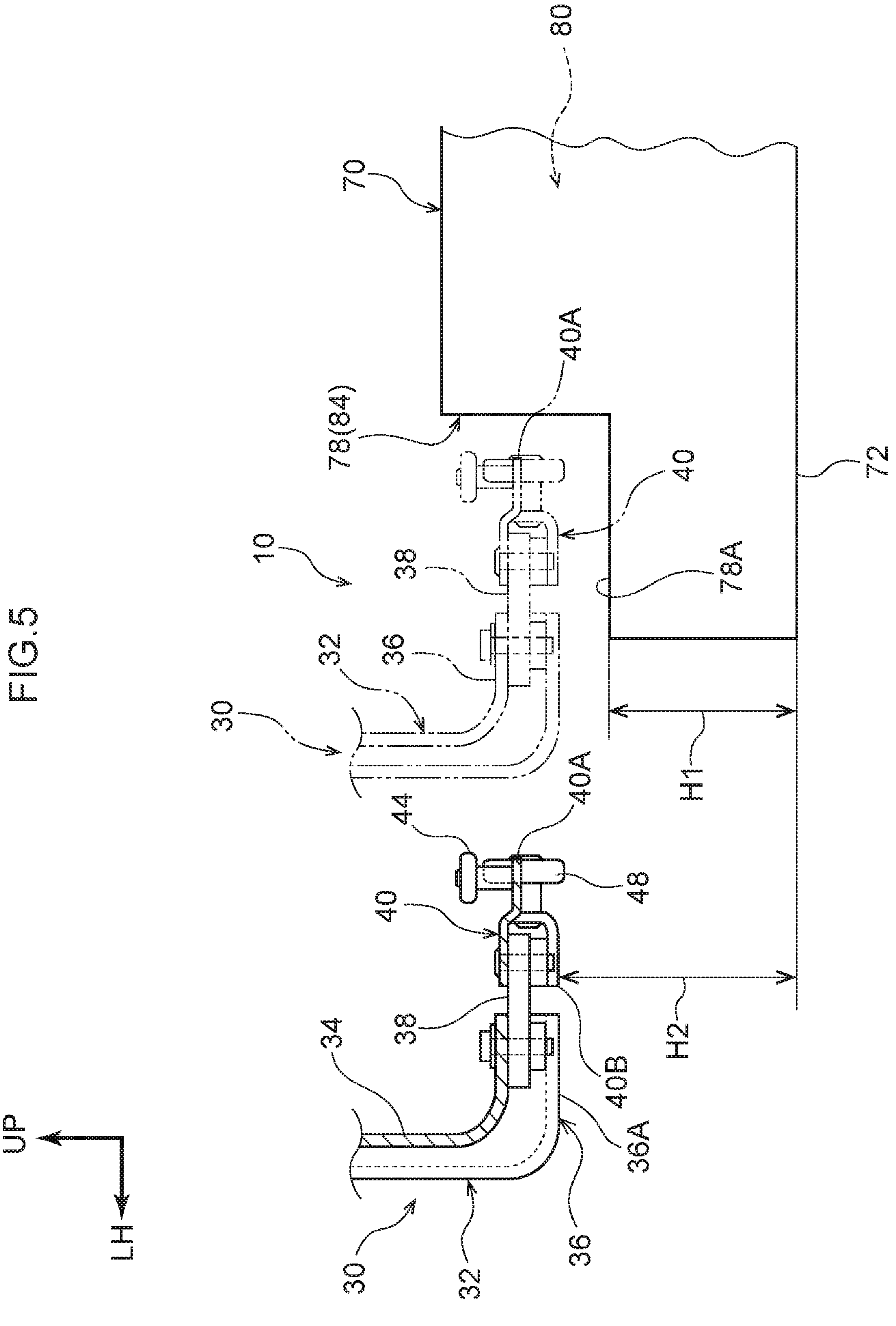
FIG. 5 is a schematic front view illustrating a portion of the vehicle side portion structure relating to the first embodiment in an enlarged manner.

Here, as illustrated in FIG. 4 and FIG. 5, in a state in which the sliding door 20 is closed, at least a portion of the base portion 40 of the lower hinge 30 (a portion that includes the inner side end portion 40A) is disposed at substantially the same position in the longitudinal direction as the concave portion 78 of the battery case 70 (the concave portion 84 of the battery stack 80), i.e., at least a portion of the base portion 40 faces the concave portion 78 of the battery case 70 (the concave portion 84 of the battery stack 80) in the left-right direction.

Further, with the lower surface of the bottom wall 72 of the battery case 70 as a reference, the height H1 of the bottom surface 78A at the concave portion 78 of the battery case 70 (the concave portion 84 of the battery stack 80) is less than or equal to the height H2 of the lower surface 36A of the base supporting portion 36 and the lower surface 40B of the base portion 40 (refer to FIG. 5). Therefore, at least a portion of the base portion 40 (a portion including the vehicle transverse direction inner side end portion 40A), which has been displaced toward the inner side, is reliably accommodated within that concave portion 78 (within the concave portion 84).

Namely, it is avoidable for at least a portion of the base portion 40 (a portion including the inner side end portion 40A), which has been displaced toward the inner side, to interfere with (hit) the battery case 70 and the battery stack 80 (the battery cells 82) that is housed at the interior of the battery case 70. Accordingly, the collision load is prevented from being transmitted from the base portion 40 (the inner side end portion 40A) to the battery case 70 and the battery stack 80 (the battery cells 82) housed at the interior of the battery case 70.

In this way, in accordance with the first embodiment, even though the base supporting portion 36 and the base portion 40 of the lower hinge 30 are disposed at the outer side of the battery case 70 as seen in a front view (i.e., are disposed at a position overlapping with the side portion 74S of the battery case 70 as seen in a side view), at least a portion of the base portion 40 of the lower hinge 30 (a portion including the inner side end portion 40A) interfering with the battery case 70 and the battery stack 80 (the battery cells 82) housed at the battery case 70 interior can be suppressed.

Moreover, in this first embodiment, as described above, the battery stack 80 is housed at the interior of the battery case 70. Therefore, as compared with a case that the battery stack 80 is not housed at the interior of the battery case 70, at least a portion of the base portion 40 (a portion including the inner side end portion 40A) interfering with (hitting) the battery stack 80 (the battery cells 82) can be more effectively suppressed or prevented by the battery case 70.

Second Embodiment

A second embodiment is described next. Note that portions that are equivalent to those of the first embodiment are denoted by the same reference numerals, and detailed description thereof (including description of common operations) is omitted as appropriate.

Figure 6:
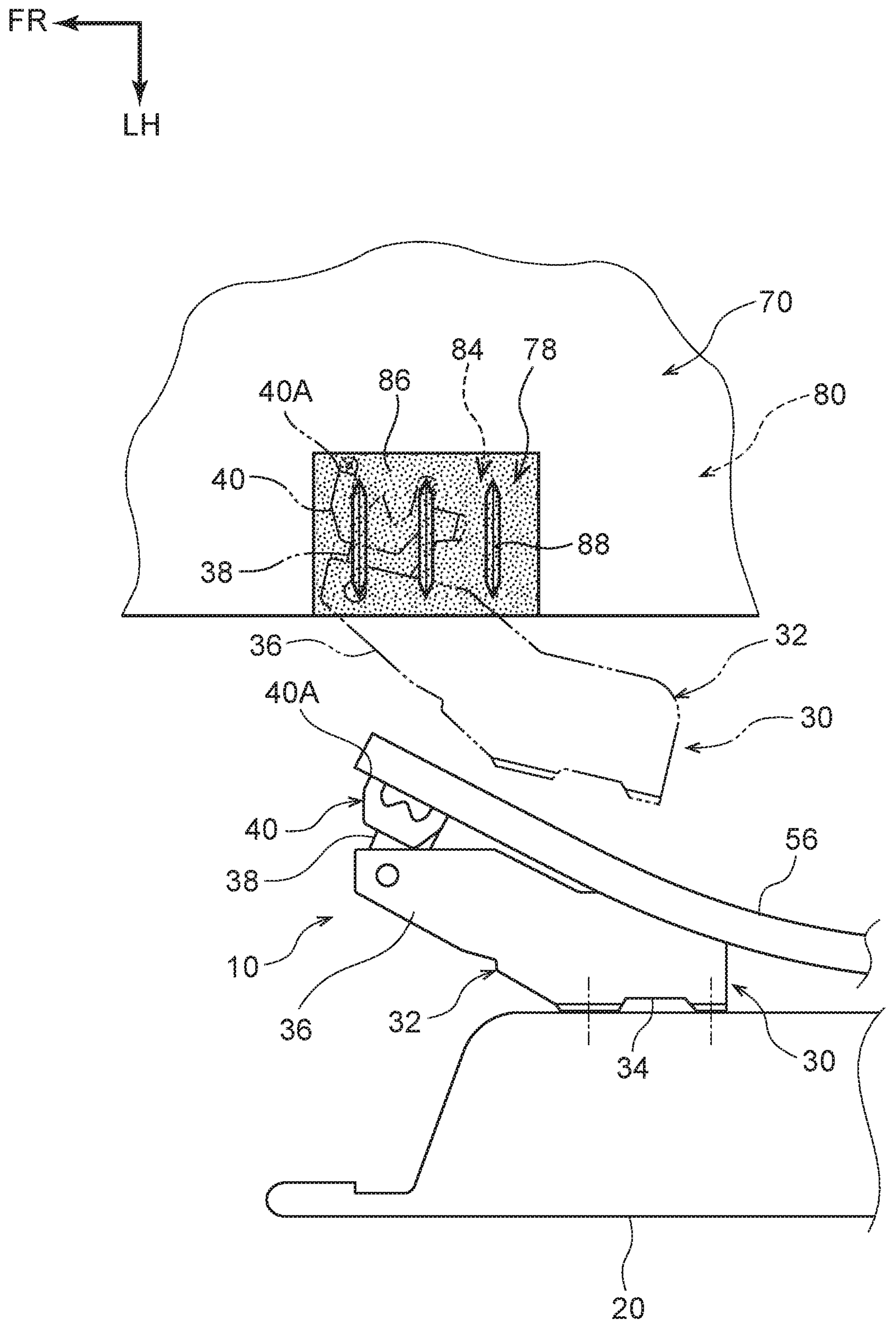
FIG. 6 is a schematic plan view illustrating a portion of a vehicle side portion structure relating to a second embodiment in an enlarged manner.
Figure 7:
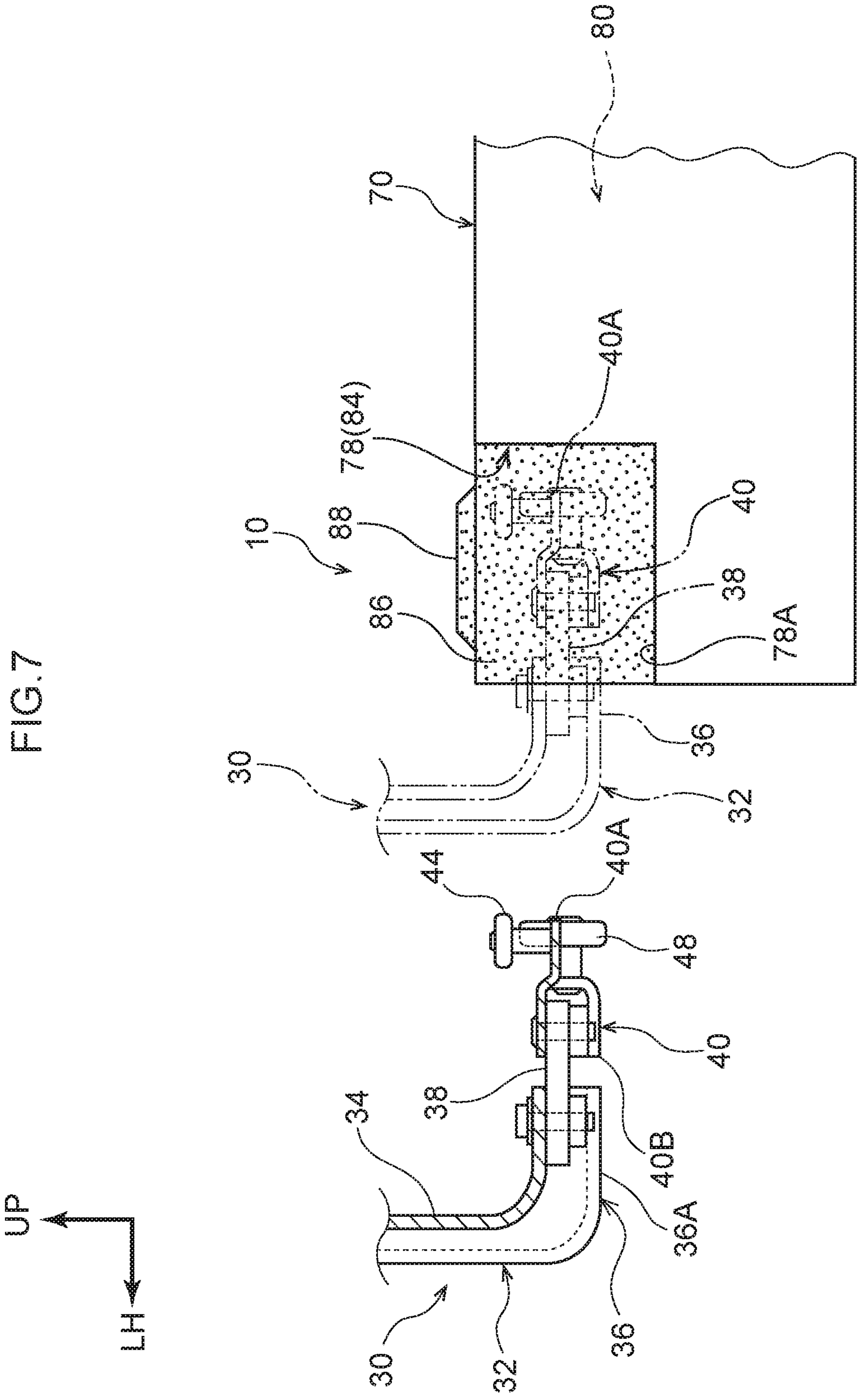
FIG. 7 is a schematic front view illustrating a portion of the vehicle side portion structure relating to the second embodiment in an enlarged manner.

As illustrated in FIG. 6 and FIG. 7, in the second embodiment, only the point that impact absorbing members 86 are fitted into the concave portions 78 (the concave portions 84) so as to fill the concave portions 78 differs from the above-described first embodiment. The impact absorbing members 86 are formed of an engineering plastic such as polyamide (PA), polycarbonate (PC) or the like, in the same shape as the concave portions 78 and so as to have a given rigidity. Plural (e.g., three) ribs 88 that run along the left-right direction are formed so as to be lined-up in the longitudinal direction on the upper surfaces of the impact absorbing members 86.

When such impact absorbing members 86 are provided, at the time when the vehicle 12 is collided with from the side and the base supporting portion 36 and the base portion 40 of the lower hinge 30 are displaced toward the inner side in the left-right direction, at least a portion of the base portion 40 (a portion including the inner side end portion 40A) is received by the impact absorbing member 86. Namely, the collision load, which is transmitted by the lower hinge 30 and is directed toward the inner side in the left-right direction, is absorbed by the impact absorbing member 86. Accordingly, at least a portion of the base portion 40 (a portion including the inner side end portion 40A) interfering with the battery case 70 and the battery stack 80 (the battery cells 82) housed at the battery case 70 interior can be suppressed.

Moreover, because the plural ribs 88 that run along the left-right direction are formed at the upper surfaces of the impact absorbing members 86 so as to be lined-up in the longitudinal direction, at least a portion of the base portion 40 (a portion including the inner side end portion 40A) is received more effectively by the impact absorbing member 86. Namely, the collision load, which is transmitted by the lower hinge 30 and is directed toward the inner side in the left-right direction, is more effectively absorbed by the impact absorbing member 86. Accordingly, at least a portion of the base portion 40 (a portion including the inner side end portion 40A) interfering with the battery case 70 and the battery stack 80 (the battery cells 82) housed at the battery case 70 interior can be suppressed more effectively.

Although the vehicle side portion structure 10 relating to embodiments has been described above on the basis of the drawings, the vehicle side portion structure 10 relating to the embodiments is not limited to the illustrated structure, and the design thereof can be changed appropriately within a scope of the present disclosure.

For example, the battery stack 80 may be provided in a state of being exposed, and not being housed at the interior of the battery case 70. Further, the concave portions 78 may be formed only in the battery case 70, and the concave portions 84 do not have to be formed in the battery stack 80. Moreover, the plural ribs 88 do not have to be formed at the impact absorbing members 86.

Further, at the battery stack 80, the plural battery cells 82 do not have to be grouped in two levels in the vertical direction, and, for example, plural battery cells (not illustrated) whose heights are higher than the battery cells 82 may be provided as a single level. In this case, it suffices to, at the outer sides in the left-right direction and the substantially central portion in the longitudinal direction, either form the concave portions 84 by not providing some battery cells or form the concave portions 84 by placing shorter battery cells 82 thereat.

Further, the base supporting portions 36 and the base portions 40 of the lower hinges 30 are disposed at the outer sides in the left-right direction and at the intermediate portions in the longitudinal direction of the side portions 74S of the battery case 70. Accordingly, the battery case 70 may be formed in a shape such that, as seen in plan view, the front end portions and the rear end portions at the side portions 74S project-out transversely in the left-right direction, for example. Namely, in the present embodiment, being disposed at the outer sides in the left-right direction of the battery case 70 as seen in front view means being disposed at the outer sides in the left-right direction and at the intermediate portions in the longitudinal direction of the side portions 74S of the battery case 70.

What is claimed is:

1. A vehicle side portion structure, comprising:

a battery disposed at a lower side of a floor panel of a vehicle; and a lower hinge provided at a lower portion of a sliding door that opens and closes a side portion of the vehicle, the lower hinge configured to support the sliding door such that the sliding door is slidable in a vehicle longitudinal direction, and, in a state in which the sliding door is closed, at least an inner side portion in a vehicle left-right direction of the lower hinge being disposed at a position overlapping with the battery as seen in a side view, wherein a concave portion is formed at a portion of the battery that the inner side portion of the lower hinge faces in the vehicle left-right direction in the state in which the sliding door is closed, and the concave portion has a size such that at least a portion of the inner side portion of the lower hinge is insertable into the concave portion, and wherein the concave portion is recessed from an upper surface toward a downward direction and from a side face toward an inner side, in the vehicle width direction, of the battery.

2. The vehicle side portion structure of claim 1, wherein a height, in a vehicle vertical direction, of a bottom surface of the concave portion is less than or equal to a height, in the vehicle vertical direction, of a lower surface of the lower hinge.

3. The vehicle side portion structure of claim 2, wherein an impact absorbing member is fitted into the concave portion so as to fill the concave portion.

4. The vehicle side portion structure of claim 3, wherein a plurality of ribs that run along the vehicle left-right direction are formed at an upper surface of the impact absorbing member.

5. The vehicle side portion structure of claim 1, wherein the battery is housed in a battery case.

6. The vehicle side portion structure of claim 5, wherein a concave portion corresponding to the concave portion of the battery is formed at the battery case.

7. The vehicle side portion structure of claim 1, wherein the concave portion is formed from the upper surface toward an intermediate position, in the vehicle height direction, of the battery.

8. A vehicle side portion structure, comprising:

a battery case disposed at a lower side of a floor panel of a vehicle; and a lower hinge provided at a lower portion of a sliding door that opens and closes a side portion of the vehicle, the lower hinge configured to support the sliding door such that the sliding door is slidable in a vehicle longitudinal direction, and, in a state in which the sliding door is closed, at least an inner side portion in a vehicle left-right direction of the lower hinge being disposed at a position overlapping with the battery case as seen in a side view, wherein a concave portion is formed at a portion of the battery case that the inner side portion of the lower hinge faces in the vehicle left-right direction in the state in which the sliding door is closed, and the concave portion has a size such that at least a portion of the inner side portion of the lower hinge is insertable into the concave portion, and wherein the concave portion is recessed from an upper surface toward a downward direction and from a side face toward an inner side, in the vehicle width direction, of the battery case.

9. The vehicle side portion structure of claim 8, wherein the concave portion is formed from the upper surface toward an intermediate position, in the vehicle height direction, of the battery case.

* * * * *